H. P. KRAFT.
SPREADER FOR PNEUMATIC TIRES.
APPLICATION FILED MAR. 19, 1917.

1,358,641.

Patented Nov. 9, 1920.

WITNESSES:

INVENTOR
Henry P Kraft
By Attorneys.

UNITED STATES PATENT OFFICE.

HENRY P. KRAFT, OF RIDGEWOOD, NEW JERSEY, ASSIGNOR TO A. SCHRADER'S SON, INCORPORATED, OF BROOKLYN, NEW YORK, A CORPORATION OF NEW YORK.

SPREADER FOR PNEUMATIC TIRES.

1,358,641. Specification of Letters Patent. Patented Nov. 9, 1920.

Application filed March 19, 1917. Serial No. 155,821.

*To all whom it may concern:*

Be it known that I, HENRY P. KRAFT, a citizen of the United States of America, residing in Ridgewood, in the county of Bergen and State of New Jersey, have invented certain new and useful Improvements in Spreaders for Pneumatic Tires, of which the following is a specification.

This invention relates to spreaders for pneumatic tires, and aims to provide certain improvements therein.

Such spreaders are usually mounted at the inner end of the valve casing and are designed to engage the edges of a tire casing or shoe, their principal function being to prevent creeping of the shoe and to a certain extent to assist in holding the latter upon the rim. Such spreaders have usually been made either of cast metal or very heavy sheet metal in order to obtain the necessary strength of construction. According to the present invention I provide a spreader which can be made of comparatively thin sheet metal by a simple stamping operation whereby the cost of the spreader can be very materially reduced without sacrifice of strength or rigidity. To this end I provide a spreader or similar device formed with corrugations which extend transversely of the length of the spreader whereby a great lateral stiffness is obtained. I also provide a bead or corrugation which is formed around the upper edge of the spreader, whereby additional rigidity and strength is obtained. The invention also includes other features of improvement which will be hereinafter more fully described.

Referring to the drawings which illustrate one form of the invention,—

Figure 1:
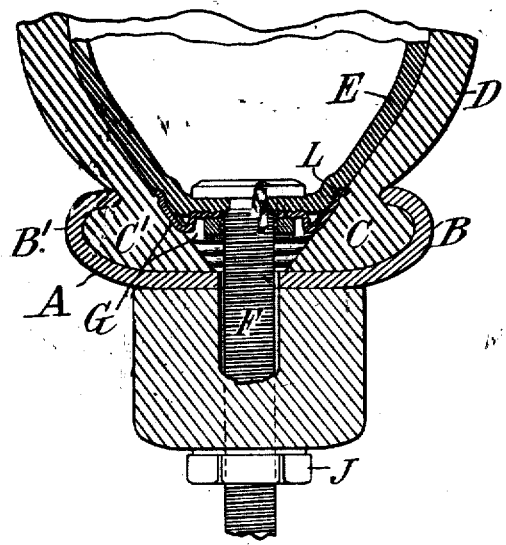
Figure 1 is a cross-sectional view of a part of a tire, showing the spreader in place.
Figure 2:
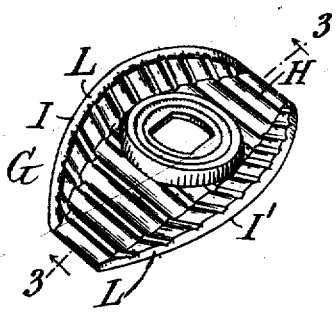
Fig. 2 is a perspective view.
Figure 3:
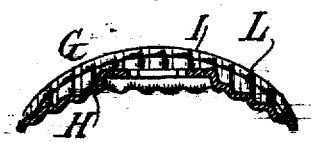
Fig. 3 is a longitudinal section.

In the drawing, let A indicate a wheel rim of common construction having inturned flanges B B' which are designed to hook over the edges C C' of the tire shoe or casing D. The inner tube is shown at E. A valve, such as F, is provided for inflating the inner tube which carries at its inner end the spreader G. The general shape of this spreader is usually that indicated, wherein there is a bottom H and side flanges I I'. The bottom H usually has a curvature which is somewhat in excess of that of the rim and the side flanges I I' are arranged angularly with regard to the bottom, so that they engage the inner sides of the tire shoe D. By drawing up on a nut J the spreader is pulled forcibly inward so that it clamps the beads C C', thus holding the tire against circumferential creeping and also assisting in preventing the beads from escaping from the flanges B B' of the rim. As very considerable strain is placed upon the spreader in use, it has heretofore been thought necessary to construct it either of a heavy cast metal piece or of heavy sheet iron or steel. I have found that the cost of production may be very greatly cheapened by employing a thin metal and forming it with suitable corrugations or ridges which greatly increase its stiffness or rigidity. By so doing I am able to produce a spreader which withstands all of the strains of use, while weighing but little more than one-half of the ordinary types of sheet metal spreaders.

The spreader may be corrugated in various ways, but I prefer to use corrugations which extend transversely of the spreader. The chief strain in use tends to bend the side flanges I I' toward each other, and the transverse corrugations, particularly at the juncture of the side flanges and bottom, so increase the strength and rigidity as to resist this strain effectually. I have also found that the stiffness and strength of the spreader may be very considerably increased by the formation of a bead or corrugation L which follows the contour of the side flanges I I' at the edges thereof. This tends to prevent buckling or inward curvature of the side flanges under the strains of use.

By the present invention not only is a considerable economy in metal obtained, but the spreader has a firmer grip upon the tire shoe or casing, and thus better prevents the shoe from creeping or dislodgment from the rim. The corrugations also have the effect of making a frictional engagement with the inner tube of the tire, which under the internal pressure is forced to enter the corrugations and is held thereby against strains tending to pull the inner tube away from its clamped engagement between the valve flange and spreader.

While I have shown and described one form of the invention, it will be understood that I do not wish to be limited thereto, as various changes may be made therein, without departing from the spirit of the invention. Thus, for instance, the corrugations may be extended in any way which produces the result required. So also the beads may be displaced slightly from the edges of the side flanges. It is obvious that the invention can be employed in connection with any spreader or bridge washer irrespective of its general shape. The term "bridge-washer" is used in the trade to designate a spreader having no side flanges II'.

What I claim is:—

1. A spreader or the like for pneumatic tires constructed of sheet metal, the metal being struck up to form transverse stiffening corrugations, crossing from the bottom into the side flanges.

2. A spreader or the like for pneumatic tires constructed of sheet metal, the metal being corrugated at the juncture of the side flanges with the bottom.

3. A spreader or the like for pneumatic tires, having bottom and side flanges, formed with lateral corrugations, and having a marginal bead or rib.

4. A spreader for pneumatic tires, having a central area or bearing face adapted to be clamped against the inner tube by a valve or the like, and having beyond the clamping area a marginal rib projecting inwardly beyond the inner face of the spreader, adapted to indent the inner tube and to be forcibly engaged thereby under the pressure of air within such tube, and tending to hold such tube and resist its pulling away from such clamped engagement.

5. A spreader or the like for pneumatic tires constructed of sheet metal and formed with corrugations whereby to stiffen it, such corrugations exposed on the side next the inner tube and forming alternate grooves and ribs which are engaged by the inner tube under internal pressure to assist in holding it against displacement.

6. A spreader or the like for pneumatic tires, having a central area or bearing face adapted to be clamped against an inner tube by a valve or the like and said spreader being formed on its side next the inner tube and outside of such clamping area with alternate projections and depressions, adapted to be engaged by the inner tube under internal pressure, whereby strains tending to pull the tube away from the clamping area are resisted.

7. A spreader or the like for pneumatic tires, having a central area or bearing face adapted to be clamped against an inner tube by a valve or the like, and said spreader being formed of sheet metal, the sheet metal being struck up at various points outside of said clamping area into substantially transverse corrugations located where the inner tube will engage them under internal pressure, and on the outer side of the flanges adapted to engage the tire casing to prevent creeping.

In witness whereof I have hereunto signed my name.

HENRY P. KRAFT.